Patented July 8, 1924.

1,500,545

UNITED STATES PATENT OFFICE.

LEW E. BUFFINGTON, OF CRAWFORDSVILLE, INDIANA.

PROCESS OF BREAD MAKING.

No Drawing.   Application filed December 3, 1923.   Serial No. 678,340.

*To all whom it may concern:*

Be it known that I, LEW E. BUFFINGTON, a citizen of the United States, residing in the city of Crawfordsville, county of Montgomery and State of Indiana, have invented new and useful Improvements in Processes of Bread Making; and I do hereby declare the following to be a full, clear, and exact description of the invention, such as will enable others skilled in the art to which it appertains to make and use the same.

My invention relates to a "no-fermentation period dough" or a "no-time dough" and has for its object the manufacture of bread by the dough being taken directly from the mixer when mixed, and worked on through the various stages of the bread making operation, without any fermentation period, and completing the bread making operation (from the time the ingredients are first mixed to the time the baked bread is removed from the oven) in from one hour and forty minutes to one hour and fifty minutes.

According to the customary methods heretofore employed in making bread, the dough as taken from the mixer must be allowed to set two hours to five hours, (according to the amount of yeast used) fermentation period, before the dough is ready to run through the machinery. When a one barrel dough batch is made with two pounds of yeast to one barrel of flour the dough at 80 degrees Fahrenheit takes five hours fermentation to mature. With five pounds of yeast to one barrel of flour at 80 degrees the dough takes from two hours to two and one-half hours fermentation to ripen. Also it is understood that during the fermentation periods these doughs are punched down and let raise again from two to three times, thus producing what is commonly known as a "time dough," "straight dough" or an "off-hand dough." Instead of depending solely upon the two hours to five hours fermentation periods to mature the dough, a larger quantity of yeast employed will make the fermentation more active and thus shorten the time of operations, or, temperatures above 85 degrees Fahrenheit in the dough will render the fermentation more energetic, thus shorten the time of operations, but in practice both of these are objectionable. The use of more yeast is too great an expense, and temperatures above 82 degrees Fahrenheit in the dough are detrimental to the yeast and they have an injurious effect upon the gluten in the flour which becomes softened and weakened resulting in failure to get sufficient expansion of the loaf in the oven. The bread is too small to be commercially successful as to sale.

By my process, I have eliminated the fermenting time entirely in the manufacture of bread. I attain this object by a newly discovered composition of ingredients, combined preferably but not necessarily in the proportions stated, viz:

| | Ounce. |
|---|---|
| Lactic acid, substantially chemically pure | $\frac{1}{2}$ |
| Ammonium phosphate, substantially chemically pure | $1\frac{1}{4}$ |
| Calcium acid phosphate, substantially chemically pure | 1 |
| Phosphoric acid ortho. U. S. P | $\frac{1}{2}$ |
| Pepsin, powdered U. S. P | $\frac{1}{4}$ |

Method of mixing: The lactic acid, ammonium phosphate, calcium acid phosphate and phosphoric acid are put in the mixer with 110 pounds of water, from 3 pounds to 4 pounds salt; from 4 pounds to 6 pounds sugar; from 3 pounds to 6 pounds lard: malt and milk if desired. The pepsin is dissolved in one-half bucket of water of about 80 degrees Fahrenheit with from 4 pounds to 6 pounds yeast, and let set about 4 minutes and pour into the mixer with the rest of the ingredients; then sift in one barrel of flour and mix ten to twelve minutes in a high speed machine; in a low speed mixer 15 minutes; then run through the divider and rounder in 10 minutes; proof box 5 minutes, through moulder 10 minutes, proof 30 minutes to 35 minutes; one pound loaf baked in 30 to 35 minutes; the entire bread making operation being completed in one hour and 40 minutes to one hour and fifty minutes, according to local shop conditions, a variation of a few minutes more or less on account of shop temperature or other conditions beyond the baker's control. The shop temperature need not be over 80 degrees Fahrenheit and can be as low as 72 degrees Fahrenheit, for cool doughs and low temperatures are employed throughout my process. The dough coming from the mixer in 80 degrees Fahrenheit to 82 degrees Fahrenheit; the temperature of proof box 90 degrees to 95 degrees Fahrenheit. In a short time dough process lactic acid does not have time to develop as it does in a long fermentation dough, so I add the lactic acid. The pepsin in combination with the lactic acid are the two great agents in my composition which obtain sufficient expansion in the loaf that would otherwise occur only from a long fermentation period. Lactic acid performs a very important function in the development of the gluten of the flour as it strengthens and toughens it and gives it resistence to gas tension. Yeast itself has only an indirect action on the gluten, its major object being to produce gases for the expansion of the loaf. As fermentation in the dough commences and progresses the dormant enzymes of the lactic acid become active. One of the few things that is taken in through the wall of the yeast plant is pepsin, and I have discovered that pepsin is a powerful stimulate to the growth of the yeast plant. I have also found that calcium acid phosphate to a small extent is a yeast stimulant, and has the property of strengthening the flour. Ammonia phosphate has for its major object the strengthening of the flour. The effect of the phosphoric acid is to supplement the lactic acid in the development of the gluten in the flour. By leaving out the lactic acid and using the remaining four ingredients in my composition and heating the dough around 90 degrees Fahrenheit the lactic acid is developed and a fair result will be attained, but not the equal as of my whole composition. By leaving out the lactic acid, and in place of same using a quantity of buttermilk, as it contains lactic acid, equally as good results will be obtained.

My system, in operation, whether the dough is mixed, made up, molded and baked by hand in the smallest bake shop, or by mechanical means in the largest modern baking plant, is positive in obtaining sufficient expansion of the loaf in the oven, dough weighed at 18 ounces bakes off a one pound loaf of 105 cubic inches volume, which is the standard for first class bread. The doughs being worked cool better texture, crust, color and flavor are obtained. The cell walls are thicker and it holds moisture longer. As the dough is at its toughest stage it goes through the machinery better. I use any kinds of flours, the weaker the flour the less the number of loaves obtained. Those bread troubles which the baker has most frequently to contend with, namely those due to temperature or fermentation conditions, including rope, wild yeast, acetic acid fermentation or "sour bread," are positively done away with by my process, for the dough is in the oven before those troubles have time to develop.

Some economies in its operation are: A saving of from two hours to five hours time per dough, over the old time "fermented doughs," with consequent lower overhead expense. At least 5% to 7% evaporation longer time methods. A larger yield of 12 to 16 actual pound loaves to the barrel obtained. By the old methods the yeast eats out twenty-five per cent of the sugar, and in my dough it eats out only one per cent, resulting in a richer, sweeter loaf of higher nutritive value. In large plants my process does away with highly paid dough room superintendence, and sets off all the expense of humidifiers for the control of dough room temperature. In plants where 15 or twenty doughs are on the dough room floor at one time, and a break in the machinery occurs, with possibly only three or four bakers in the bakery who could mold by hand, some doughs will get too old and have to be thrown away. My process safeguards against this loss as the doughs would be mixed and taken as made; only two troughs would be needed.

Having described my invention, I claim:

1. A process of making leavened bread, which comprises bringing a composition of ingredients consisting of lactic acid, ammonium phosphate, calcium acid phosphate, phosphoric acid, and pepsin into admixture and incorporation with the water, yeast, salt, sugar, lard, flour, and other materials of the dough batch, mixing, making up and baking the batch, without any fermentation period, and completing the bread making operation from start to finish in from one hour and forty minutes to one hour and fifty minutes; substantially as described.

2. The process of making leavened bread, which comprises bringing lactic acid ½ ounce, ammonium phosphate 1¼ ounces, calcium acid phosphate 1 ounce, phosphoric acid ½ ounce, and pepsin ¼ ounce into intimate admixture and incorporation with water 110 pounds to 120 pounds, salt 3 pounds, sugar 6 pounds more or less, lard 3 pounds, yeast 5 pounds, malt and milk if desired and other materials of the dough batch, mixing, making-up, and baking the batch, eliminating the fermentation time, and completing the bread making operation from start to finish in the time of from one hour and forty minutes to one hour and fifty minutes; substantially as described.

In witness whereof, I affix my signature this 23rd of November, 1923, in the presence of two witnesses.

LEW E. BUFFINGTON.

Witnesses:
ARTHUR T. RICE,
RALPH U. McCORD.